United States Patent
Ito

(10) Patent No.: US 12,142,981 B2
(45) Date of Patent: Nov. 12, 2024

(54) STATOR PROVIDED WITH INSULATING PAPER, MOTOR HAVING STATOR, AND METHOD FOR MANUFACTURING MOTOR

(71) Applicant: FANUC CORPORATION, Yamanashi (JP)

(72) Inventor: Takashi Ito, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 17/910,903

(22) PCT Filed: Apr. 23, 2021

(86) PCT No.: PCT/JP2021/016530
§ 371 (c)(1),
(2) Date: Sep. 12, 2022

(87) PCT Pub. No.: WO2021/220986
PCT Pub. Date: Nov. 4, 2021

(65) Prior Publication Data
US 2023/0163651 A1 May 25, 2023

(30) Foreign Application Priority Data
Apr. 30, 2020 (JP) .................................. 2020-080421

(51) Int. Cl.
*H02K 3/34* (2006.01)
*H02K 3/487* (2006.01)
(Continued)

(52) U.S. Cl.
CPC ............... *H02K 3/34* (2013.01); *H02K 3/487* (2013.01); *H02K 15/105* (2013.01); *H02K 21/14* (2013.01)

(58) Field of Classification Search
CPC ........ H02K 3/34; H02K 3/487; H02K 15/105; H02K 21/14
(Continued)

(56) References Cited

U.S. PATENT DOCUMENTS 5,093,543 A * 3/1992 Patton ...................... H02K 3/38
174/138 R
5,659,219 A * 8/1997 Momose .............. H02K 15/105
310/260

(Continued)

FOREIGN PATENT DOCUMENTS

| JP | 59080127 A | 5/1984 |
| JP | 02129155 U | 10/1990 |

(Continued)

OTHER PUBLICATIONS

English Abstract and Machine Translation for Japanese Publication No. 2016-046890 A, published Apr. 4, 2016, 31 pgs.
(Continued)

*Primary Examiner* — Rashad H Johnson
(74) *Attorney, Agent, or Firm* — Fredrikson & Byron, P.A.

(57) ABSTRACT

Provided are a stator having insulating paper positioned and fixed using an inexpensive and simple structure, a motor having the stator, and a method for manufacturing the stator. The stator 18 of a motor is provided with a stator core 26 having a plurality of slots 16, a plurality of coils 32 positioned in the slots, pieces of coil end insulating paper 40 that are positioned between a plurality of coil ends 44 and that insulate the coil ends 44 from each other, and a plurality of pieces of intercoil insulating paper 34 positioned in the slots 16, each of the plurality of pieces of intercoil insulating paper 34 having a projection 38 projecting from an axial end part 36 of the stator core. Each of the pieces of coil end insulating paper 40 has an adhesive part 42, and a plurality
(Continued)

of projections 38 are affixed into a single piece of coil end insulating paper 40.

11 Claims, 15 Drawing Sheets

(51) Int. Cl.
*H02K 15/10* (2006.01)
*H02K 21/14* (2006.01)

(58) Field of Classification Search
USPC .......................................................... 310/214
See application file for complete search history.

(56) References Cited

U.S. PATENT DOCUMENTS

| | | | | |
|---|---|---|---|---|
| 9,882,445 | B2* | 1/2018 | Coldwate | H02K 3/34 |
| 2005/0168097 | A1* | 8/2005 | Takizawa | H02K 3/38 |
| | | | | 310/215 |
| 2014/0175937 | A1* | 6/2014 | Coldwate | H02K 3/38 |
| | | | | 310/215 |
| 2018/0175693 | A1* | 6/2018 | Mitsui | H02K 3/345 |
| 2020/0295619 | A1* | 9/2020 | Mitsui | H02K 3/38 |
| 2021/0288543 | A1* | 9/2021 | Fukuda | H02K 15/105 |
| 2023/0283133 | A1* | 9/2023 | Hirota | H02K 3/34 |
| 2023/0318381 | A1* | 10/2023 | Ishikawa | H02K 21/14 |
| | | | | 310/208 |
| 2023/0327508 | A1* | 10/2023 | Hikima | H02K 15/105 |
| | | | | 310/215 |

FOREIGN PATENT DOCUMENTS

| | | | |
|---|---|---|---|
| JP | 09131012 | A | 5/1997 |
| JP | 2005312222 | A | 11/2005 |
| JP | 2007060819 | A | 3/2007 |
| JP | 2007104826 | A | 4/2007 |
| JP | 2008042959 | A | 2/2008 |
| JP | 2008131749 | A | 6/2008 |
| JP | 2008263726 | A | 10/2008 |
| JP | 2012080699 | A | 4/2012 |
| JP | 2013207820 | A | 10/2013 |
| JP | 2016046890 | A | 4/2016 |

OTHER PUBLICATIONS

English Abstract and Machine Translation for Japanese Publication No. 2013-207820 A, published Oct. 7, 2013, 21 pgs.
English Abstract and Machine Translation for Japanese Publication No. 2012-080699 A, published Apr. 19, 2012, 38 pgs.
English Abstract and Machine Translation for Japanese Publication No. 2008-263726 A, published Oct. 30, 2008, 21 pgs.
English Abstract and Machine Translation for Japanese Publication No. 2008-131749 A, published Jun. 5, 2008, 16 pgs.
English Abstract and Machine Translation for Japanese Publication No. 2008-042959 A, published Feb. 21, 2008, 34 pgs.
English Abstract and Machine Translation for Japanese Publication No. 2007-104826 A, published Apr. 19, 2007, 23 pgs.
English Abstract and Machine Translation for Japanese Publication No. 2007-060819 A, published Mar. 8, 2007, 27 pgs.
English Abstract and Machine Translation for Japanese Publication No. 2005-312222 A, published Nov. 4, 2005, 21 pgs.
English Abstract and Machine Translation for Japanese Publication No. 59-080127 A, published May 9, 1984, 6 pgs.
English Abstract and Machine Translation for Japanese Publication No. 09-131012 A, published May 16, 1997, 21 pgs.
English Machine Translation for Japanese Publication No. 02-129155 U, published Oct. 24, 1990, 2 pgs.
PCT International Search Report dated Jul. 13, 2021 for International Application No. PCT/JP2021/016530, from which the instant application is based, 3 pgs.

* cited by examiner

STATOR PROVIDED WITH INSULATING PAPER, MOTOR HAVING STATOR, AND METHOD FOR MANUFACTURING MOTOR

RELATED APPLICATIONS

This application is a 35 U.S.C. 371 national phase filing from International Application No. PCT/JP2021/016530, filed Apr. 23, 2021, which claims priority to Japanese Application No. 2020-080421, filed Apr. 30, 2020, the contents of which are incorporated herein by reference.

TECHNICAL FIELD

The present invention relates to a stator having an insulating paper, an electric motor having the stator, and a method for manufacturing the electric motor.

BACKGROUND ART

In the prior art, in an electric motor such as a three-phase rotating electric machine, in order to insulate coils having different phases from each other, it is well known to insert a phase-to-phase insulating paper between the coils (e.g., see Patent Literature 1 and 2). It is also well known to fix the phase-to-phase insulating paper with an adhesive tape, etc., in order to prevent the phase-to-phase insulating paper from being misaligned (e.g., see Patent Literature 3 to 6).

CITATION LIST

Patent Literature

[PTL 1] JP 2007-060819 A
[PTL 2] JP 2013-207820 A
[PTL 3] JP H09-131012 A
[PTL 4] JP 2008-131749 A
[PTL 5] JP 2007-104826 A
[PTL 6] JP 2005-312222 A

SUMMARY OF INVENTION

Technical Problem

When the phase-to-phase insulating paper is too thick relative to the width of a slot of a stator core, it is difficult to insert it into the slot, and conversely, when it is too thin, it is easy for it to slip off. Further, in a conventional electric motor, it is difficult to provide a means for fixing the phase-to-phase insulating paper in the radial direction around the coil end. Therefore, there is also the problem that the position of the phase-to-phase insulating paper within the slot is easily offset together with the coil wound in the slot.

On the other hand, when the phase-to-phase insulating paper has a special shape corresponding to the shape of the coil and/or the slot pitch, etc., the manufacturing cost thereof increases, and in addition, such a phase-to-phase insulating paper cannot flexibly cope with various coil shapes and/or winding arrangements, etc. Further, it is necessary to perform shaping such as bending the coil end of the coil, depending on the shape of the phase-to-phase insulating paper. Therefore, when the phase-to-phase insulating paper protrudes from the stator core, the coil length becomes long.

Solution to Problem

One aspect of the present disclosure is a stator of an electric motor, comprising: a stator core having a plurality of slots; a plurality of coils positioned in the slots, each coil having a coil end positioned outside relative to an axial end of the stator core; at least one coil end insulating paper positioned between the coil ends so as to insulate the coil ends from each other; a plurality of coil-to-coil insulating papers positioned in the slots, each coil-to-coil insulating paper having a protruding portion which protrudes from at least one of both axial ends of the stator core; and a wedge insulating paper positioned in the slot where the coil is positioned, the wedge insulating paper positioned inside in a radial direction of the stator core relative to the coil, wherein each of the coil end insulating papers has an adhesive portion, and a plurality of the protruding portions are adhered to one coil end insulating paper.

Another aspect of the present disclosure is an electric motor having the above stator.

Still another aspect of the present disclosure provides a manifacturing method of a stator of an electric motor, comprising: inserting a plurality of coils into a plurality of slots of a stator core so that each coil has a coil end positioned outside relative to an axial end of the stator core; inserting a plurality of coil-to-coil insulating papers into the slots so that each coil-to-coil insulating paper has a protruding portion which protrudes from at least one of the two axial ends of the stator core; and positioning at least one coil end insulating paper having an adhesive portion at at least one of the two axial ends of the stator core so that each coil end insulating paper is positioned between the coil ends and a plurality of the protruding portions are adhered to each coil end insulating paper.

Advantageous Effects of Invention

According to the aspect of the present disclosure, the plurality of coil-to-coil insulating papers are fixed by at least one coil end insulating paper, more specifically, the coil-to-coil insulating papers are adhered to a plurality of portions of each coil end insulating paper. Therefore, the coil end insulating paper can be easily positioned and fixed. Further, the structure composed of such coil end insulating paper and coil-to-coil insulating paper can be applied to a stator of an electric motor having an arbitrary number of poles and slot arrangement.

DESCRIPTION OF EMBODIMENTS

Figure 1:
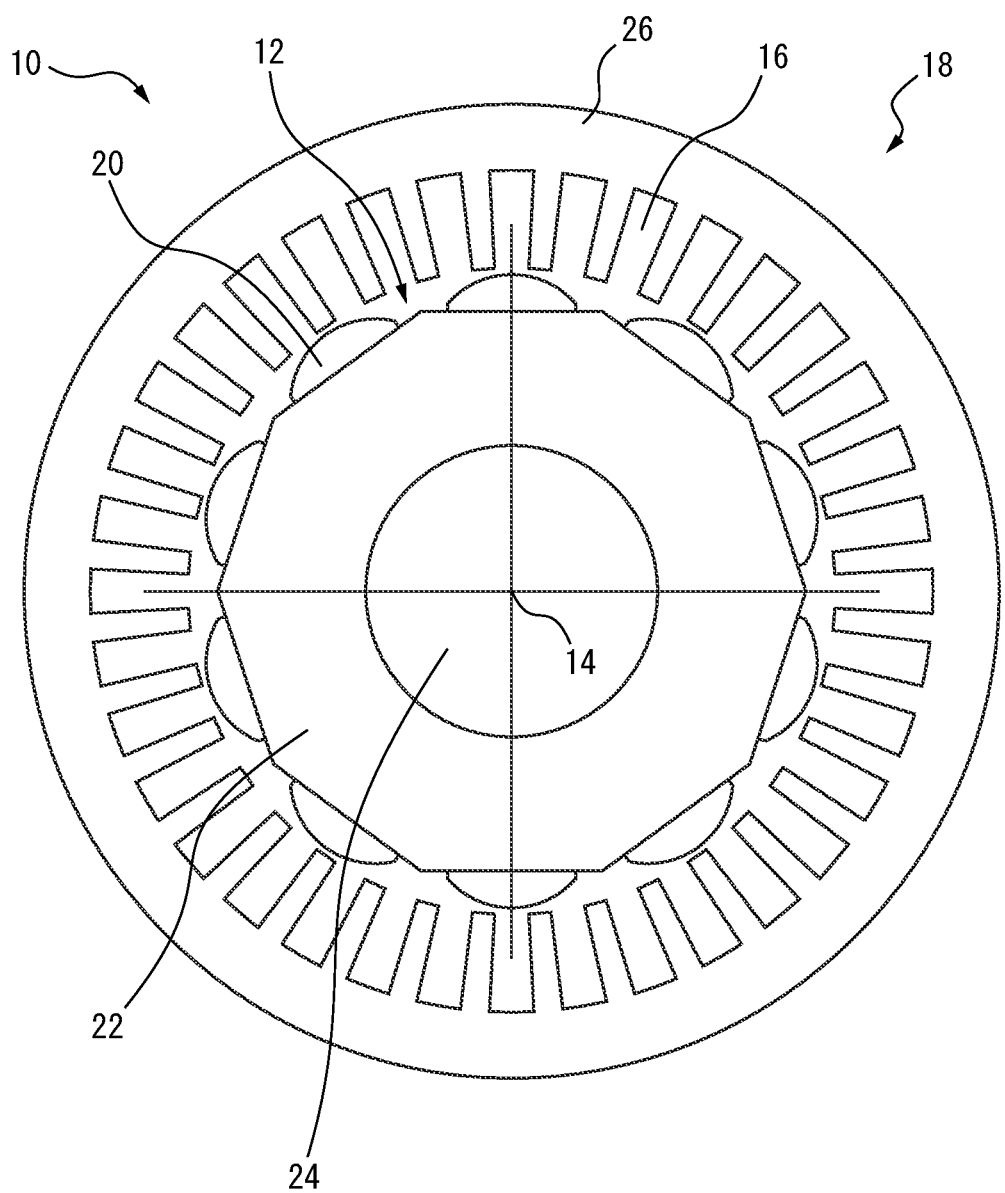
FIG. 1 is a cross-sectional view showing a schematic configuration of an electric motor according to the present disclosure.

FIG. 1 is a radial cross-sectional view showing a schematic structure of an electric motor 10 according to a preferred embodiment of the present invention. The motor 10 is a three-phase AC motor having ten poles and thirty-six slots, and has: a rotor 12 having a plurality of pairs of magnetic poles; a plurality of slots 16 extending in the direction of a rotation axis 14 of the rotor 12 and arranged in the circumferential direction of the rotation axis 14; a stator 18 radially opposed to the rotor 12; a plurality of windings inserted into the slot 16 and wound around the stator 18; and a sheet-shaped insulator positioned adjacent to the windings (described later). However, the present disclosure is not limited to this, and there are no particular restrictions on, for example, the number of poles of the motor, the number of slots, or the shape or the number of phases of the coil.

The rotor 12 includes a plurality of (in this case, ten) (permanent) magnets 20, a rotor core 22, and a rotor shaft 24, and rotates about the rotation axis 14. The present disclosure is mainly characterized by the configuration of a sheet-shaped insulator (hereinafter referred to as insulating paper) arranged in or near the slot 16 formed in a stator core 26 of the stator 18. Therefore, description of the rotor 12 will be omitted hereafter.

First Embodiment

Next, the structure and a manufacturing method of the stator 18 will be described with reference to FIGS. 2 to 12. Here, an example in which a three-phase (U, V, W) coils are arranged in the stator core 26 having thirty-six slots 16 will be described.

Figure 2:
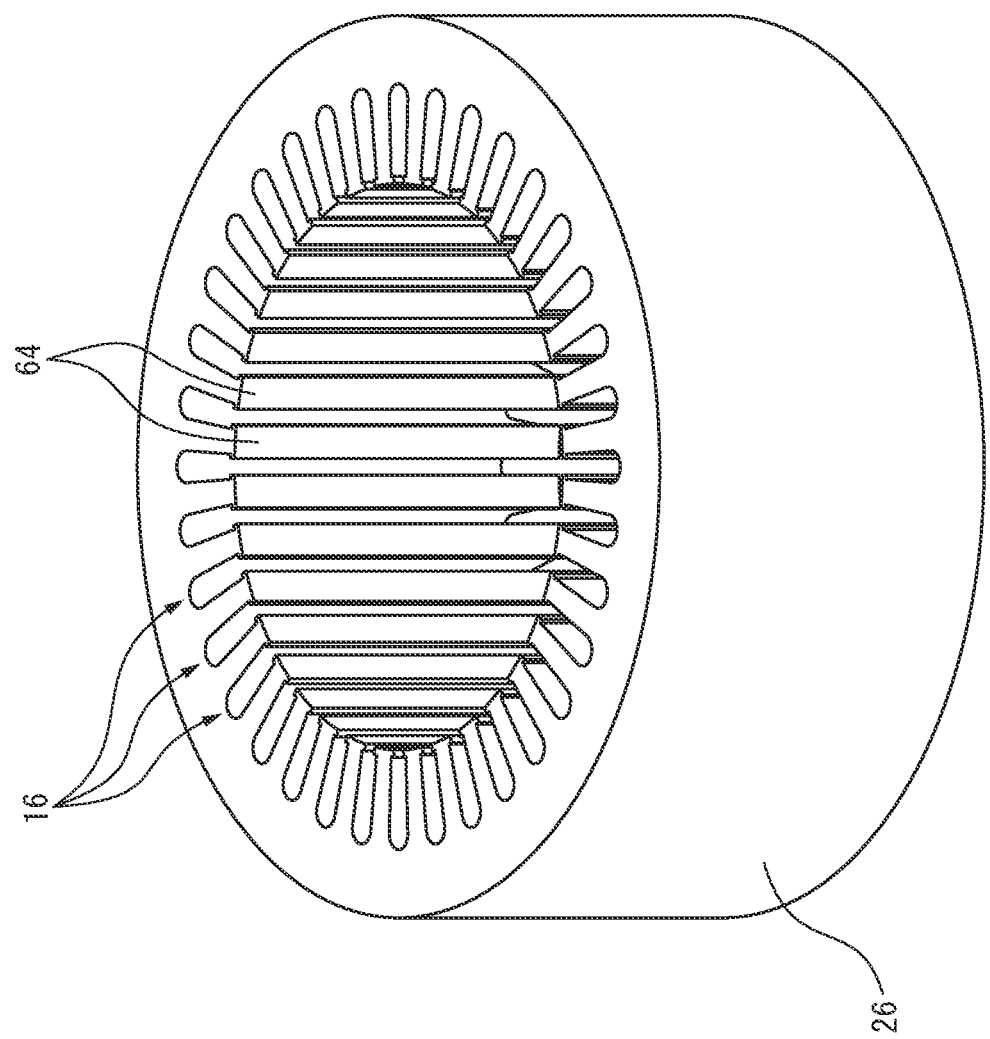
FIG. 2 is a perspective view showing a stator core according to a first embodiment.
Figure 3:
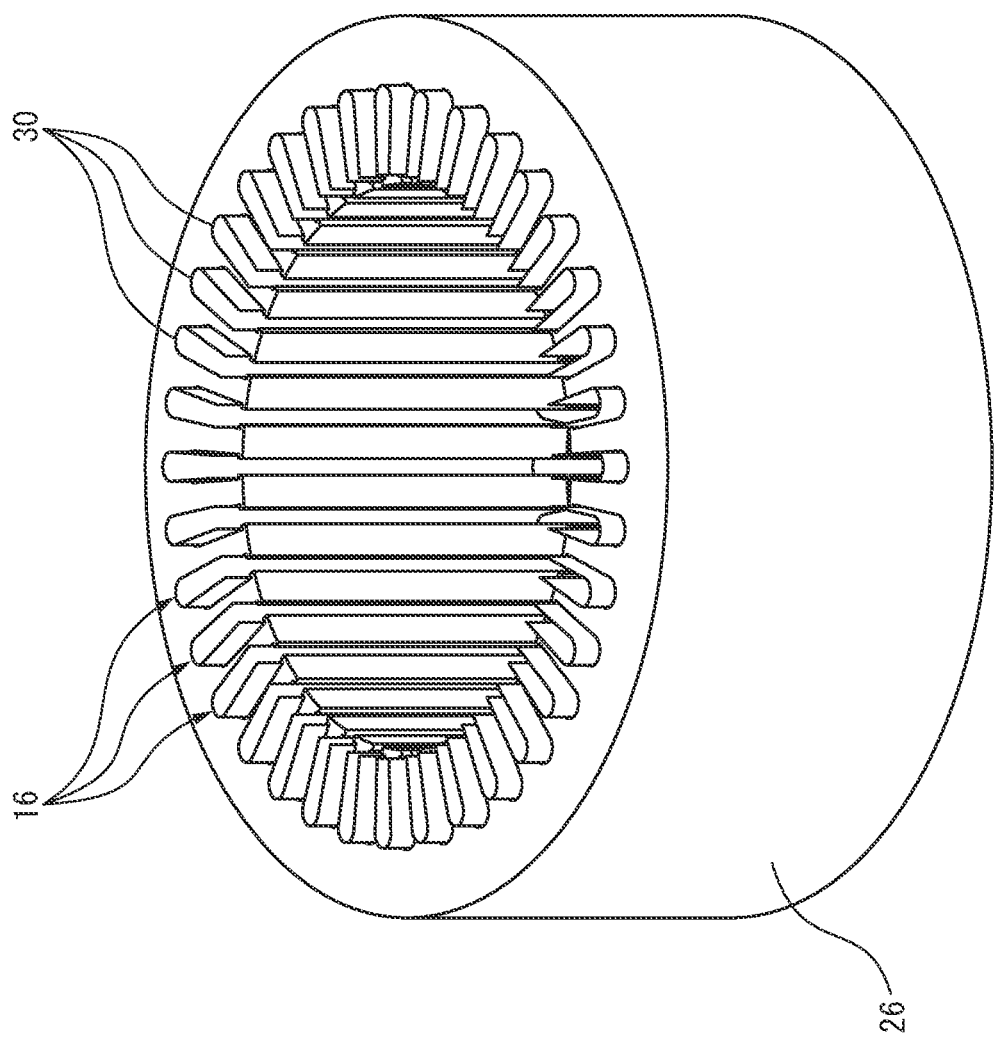
FIG. 3 is a view showing a state in which a slot liner insulating paper is inserted into a slot of the stator core.

First, as shown in FIG. 2, the stator core 26 having a plurality of slots 16 (thirty-six in the illustrated example) is provided, and then a slot liner insulating paper 30 is positioned in each slot 16, as shown in FIG. 3. In the illustrated example, the slot liner insulating paper 30 is inserted into all of the slots 16. However, when there is a slot in which the winding (coil) described later is not inserted at all, it is not necessary to arrange the slot liner insulating paper 30 and a wedge insulating paper 62 as described later in that slot.

Figure 4:
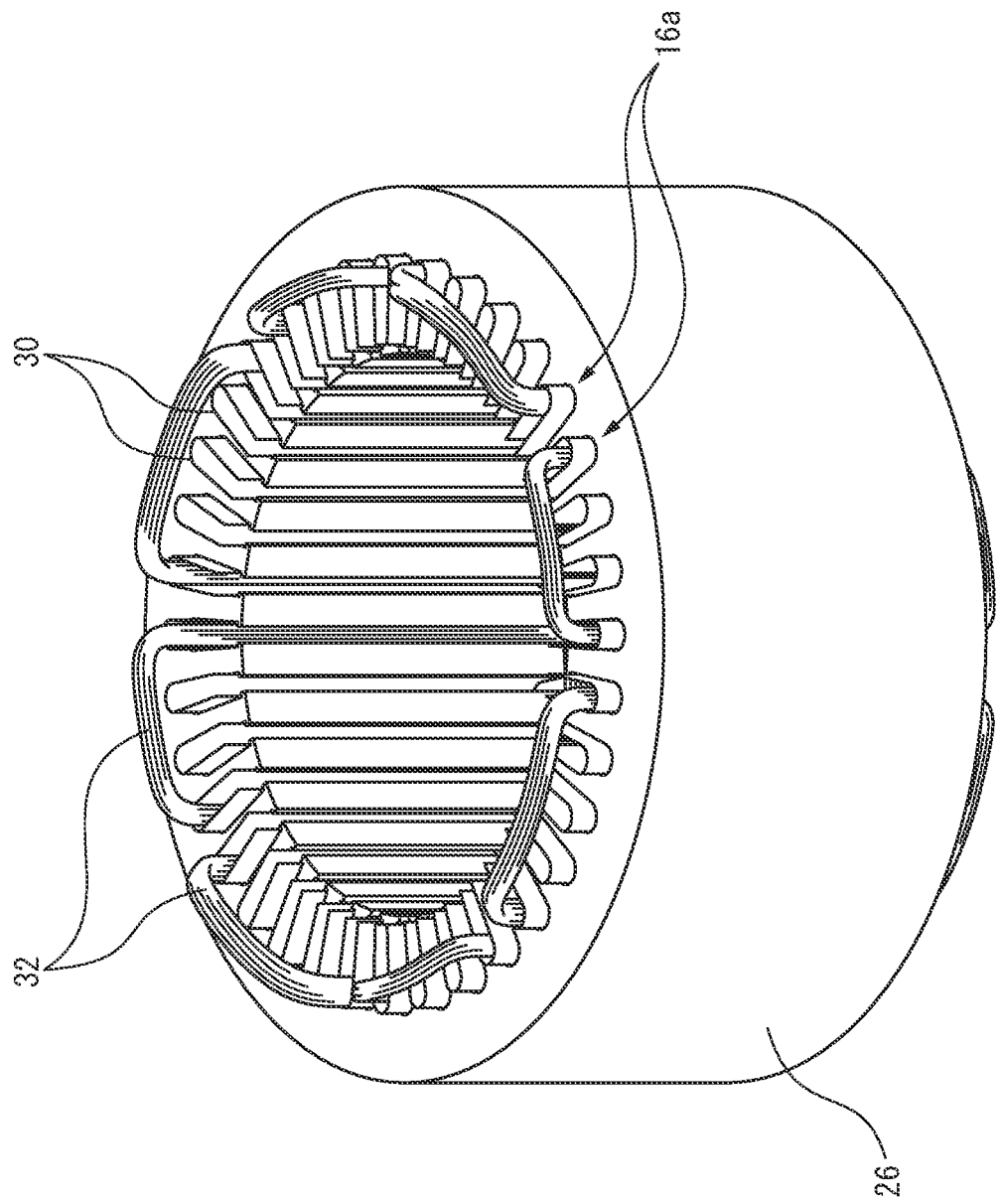
FIG. 4 is a view showing a state in which a coil of a first phase is inserted into the slot.

Next, as shown in FIG. 4, a coil 32 of a first phase (for example, the U phase) is inserted into some of the plurality of slots 16 (here, the slot 16a). Specifically, the slot liner insulating paper 30 is configured and positioned so as to electrically insulate between the stator core 26 and the coil in the slot.

Figure 5:
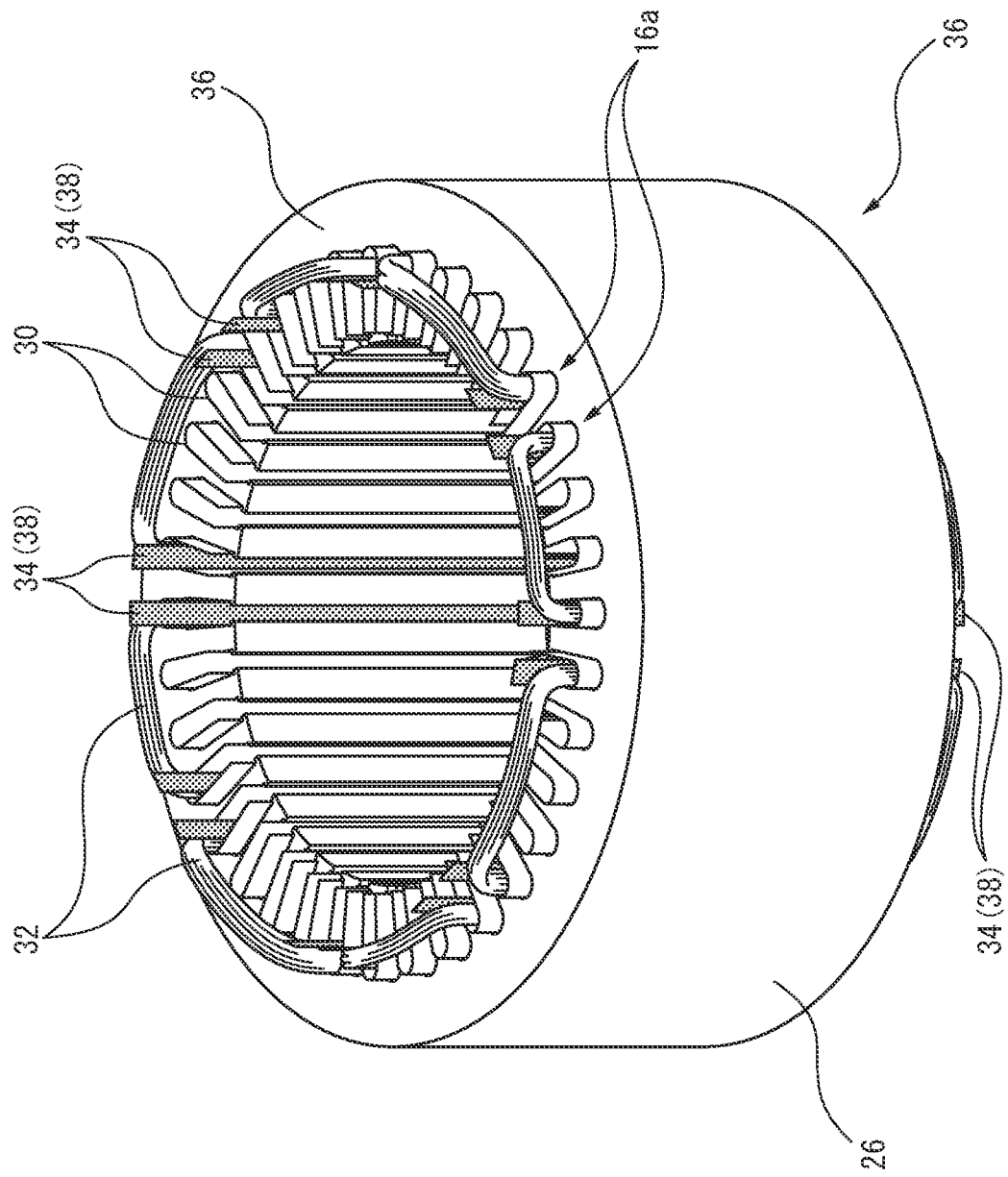
FIG. 5 is a view showing a state in which a. first coil-to-coil insulating paper is inserted into the slot.

Next, as shown in FIG. 5, a vertically long first coil-to-coil insulating paper (phase-to-phase insulating paper) 34 (elongated in the axial direction of the stator core 26) is inserted into a slot 16a into which the U-phase coil 32 is inserted. The first coil-to-coil insulating paper 34 is configured and positioned so as to have a protruding portion 38 which axially protrudes from at least one of two axial ends 36 of the stator core 26. Preferably, the first coil-to-coil insulating paper 34 is longer in length than the axial length of the stator core 26, and is positioned in the slot 16a so as to project axially from both ends 36 as shown in FIG. 5.

Figure 6:
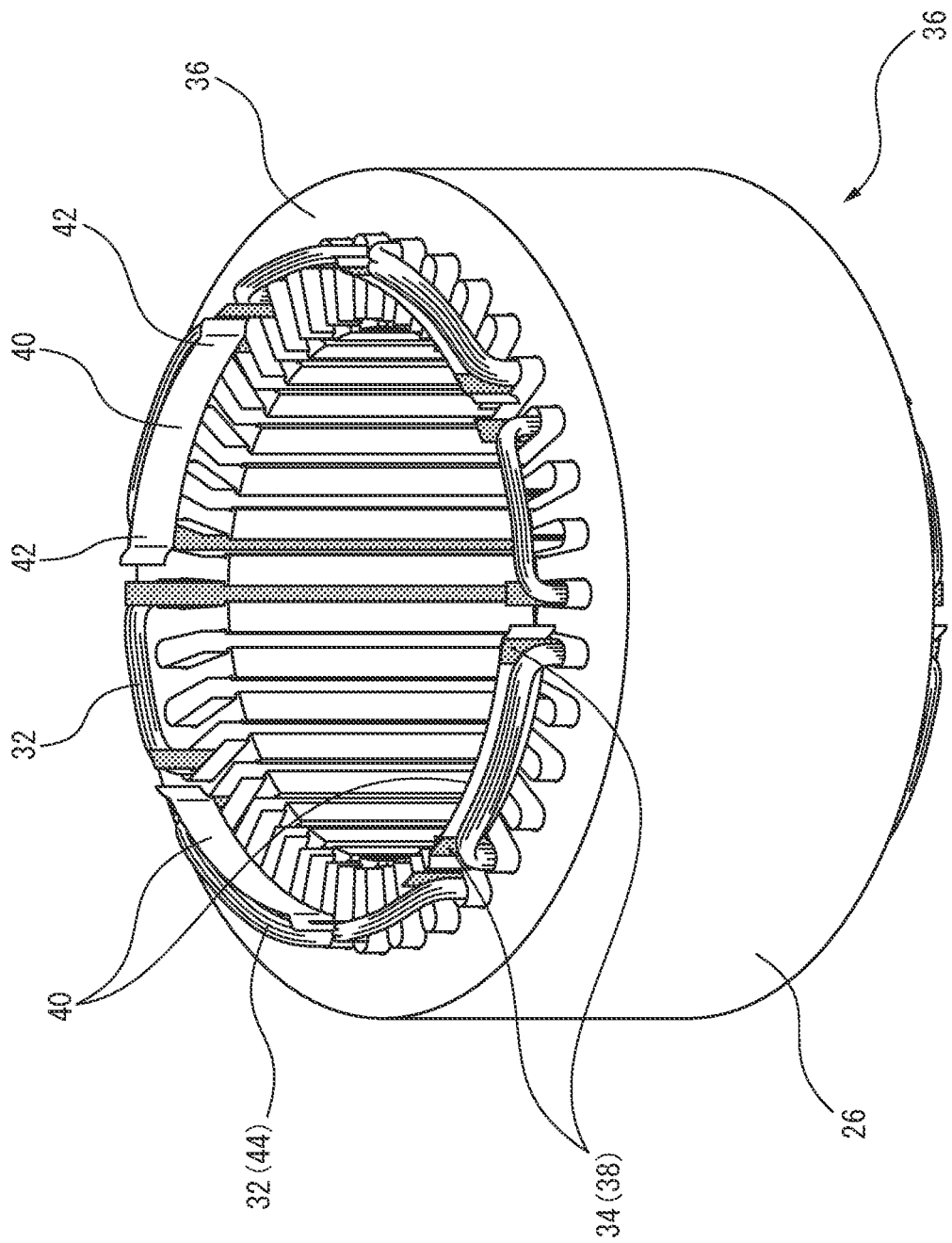
FIG. 6 is a view showing a state in which a first coil end insulating paper is adhered to a protruding portion of the first coil-to-coil insulating paper.

Next, as shown in FIG. 6, a plurality of first coil end insulating papers 40, each having an adhesive portion 42, are arranged so that one coil-end insulating paper 40 is adhered to the plurality of protruding portions 38. In the illustrated embodiment, the strip-shaped first coil end insulating paper 40 extends in the circumferential direction near the end surface 36 of the stator core 26, and the adhesive portions 42 provided at least at both ends of the insulating paper 40 are adhered to and overlapped with the protruding portion 38 of the first coil-to-coil insulating paper 34. In this regard, the first coil end insulating paper 40 may have the adhesive portion 42 on the entirety of one side thereof, and may be adhered to the protruding portion 38 and also to a coil end 44 of the coil 32.

Herein, a wire rod such as a copper wire or a bundle of the wire rods, through which an electric current flows, is referred to as a "winding wire", and, a ring shape (including a figure of eight shape) in Which the winding wire is closed is referred to as a "coil". Further, the "coil end" refers to a portion of the coil which is not inserted into the slot of the stator core, i.e., a portion which exists axially outside the axial end of the stator core. A plurality of (in-phase) coils may be electrically connected to each other by a wire rod or a winding wire called "a connecting line" (see FIG. 16 below).

Figure 7:
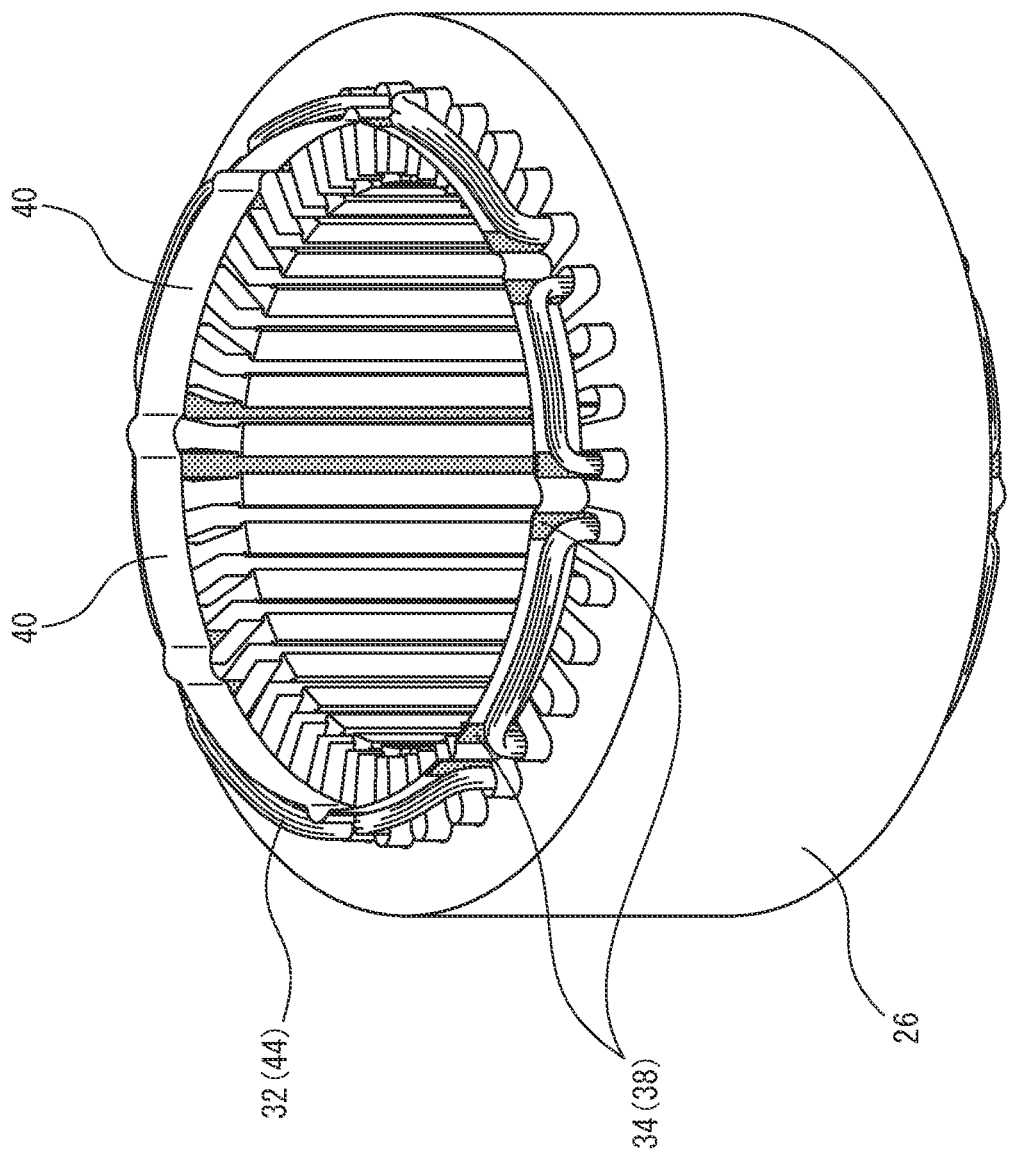
FIG. 7 is a view showing a state in which the coil end insulating paper is adhered to all of the protruding portions.

Next, as shown in FIG. 7, the operation described with reference to FIG. 6 is repeated so that all of the protruding portions 38 are adhered to either of the plurality of first coil end insulating papers 40. In this regard, it is preferable that the coil end 44 of the (preferably all) U-phase coils 32 is also adhered to (the adhesive portion 42 of) the first coil end insulating paper 40. Further, as illustrated, the plurality of strip-shaped coil end insulating papers 40 can be adhered to each other at their longitudinal end portions to form a single ring shape as a whole, but this treatment may not be performed. The first coil end insulating paper 40 is configured and positioned so that the coil end 44 of the U-phase coil 32 and a coil end 56 of a V-phase coil 46 described later do not come into contact with each other (i.e., they are electrically insulated).

Figure 8:
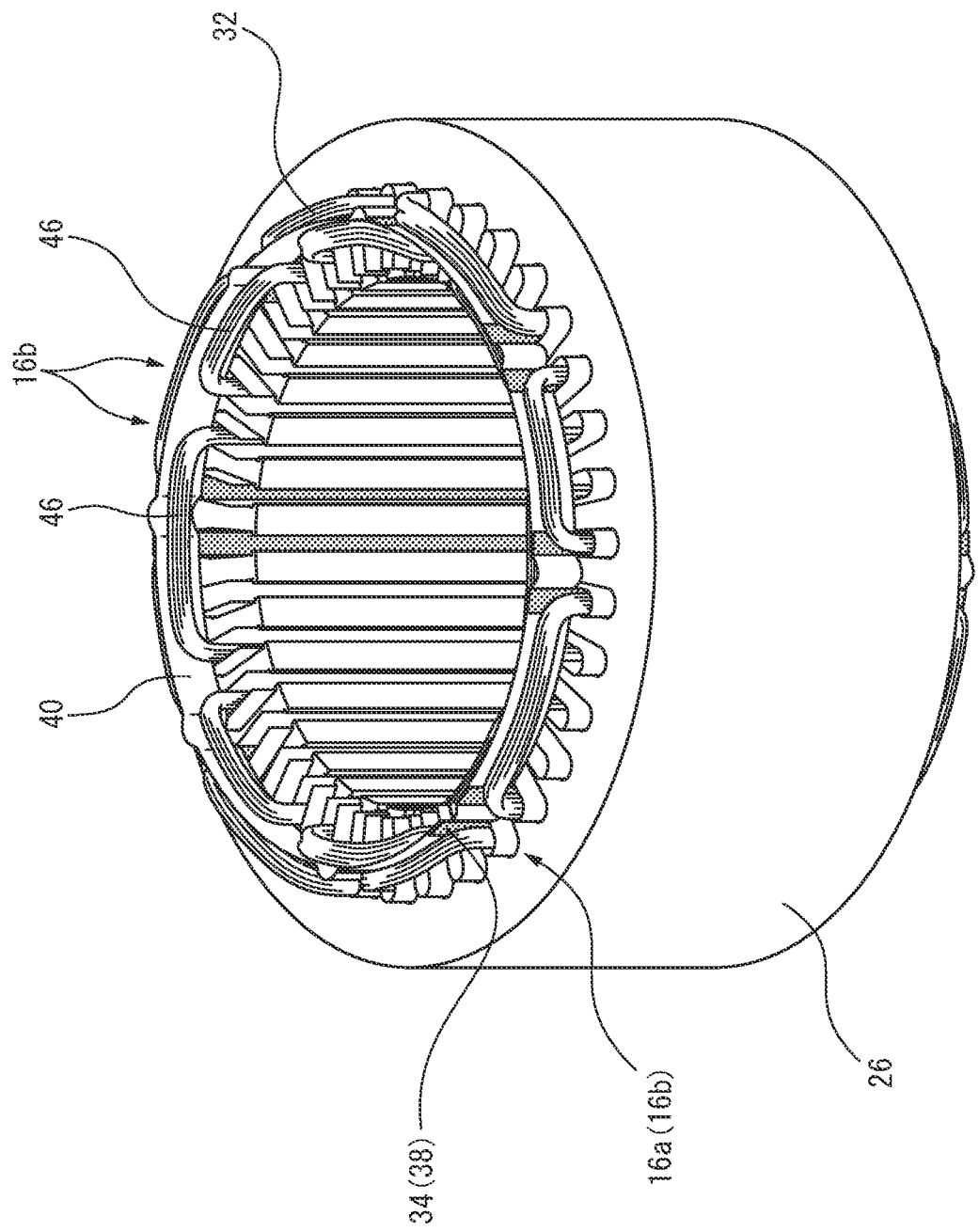
FIG. 8 is a view showing a state in which a coil of a second phase is inserted into the slot.

Next, as shown in FIG. 8, similarly to the process of FIG. 4, the coil 46 of the second phase (for example, a V-phase) is inserted into some of the plurality of slots 16 (here, slots 16b). In this regard, the V-phase coil 46 may be inserted into the slot 16a into which the U-phase coil 32 is inserted. In that case, in the slot 16b (16a), the first coil-to-coil insulating paper 34 is inserted between the U-phase coil 32 and the V-phase coil 46. In other words, the first coil-to-coil insulating paper 34 is configured and positioned so as to electrically insulate between the two coils having different phases.

In addition, in an electric motor in which the number of current phases and the number of layers of the coil end are different from those in the first embodiment, the number of executions of the operations shown in FIGS. 5 to 8 changes. For example, in the manufacturing process of a stator of an electric motor in which the number of current phases and the number of layers of a coil end are larger than those in the first embodiment, the number of operations shown in FIGS. 5 to 8 is increased by that amount.

Figure 9:
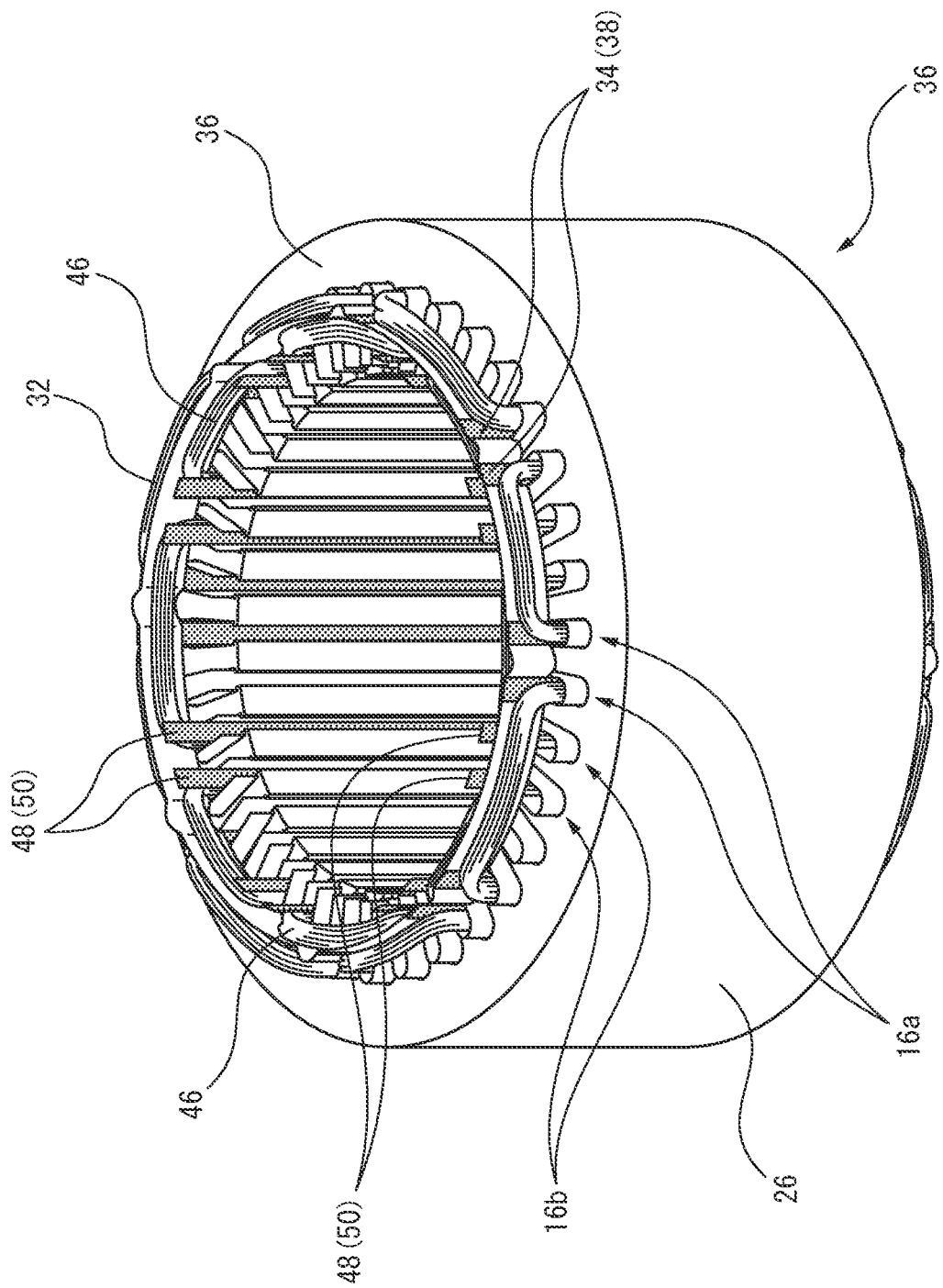
FIG. 9 is a view showing a state in which a second coil-to-coil insulating paper is inserted into the slot.

Next, as shown in FIG. 9, similarly to the process of FIG. 5, a vertically long second coil-to-coil insulating paper (phase-to-phase insulating paper) 48 is inserted into the slot 16*b* in which the V-phase coil 46 is inserted. Similar to the first coil-to-coil insulating paper 34, the second coil-to-coil insulating paper 48 is configured and positioned so as to have a protruding portion 50 which axially protrudes from at least one of the two axial ends 36 of the stator core 26. Preferably, the second coil-to-coil insulating paper 48 is longer in length than the axial length of the stator core 26 and is positioned in the slot 16*b* so as to project axially from both ends 36 as shown in FIG. 9. The second coil-to-coil insulating paper 48 may have the same shape, dimensions and material as the first coil-to-coil insulating paper 34.

Figure 10:
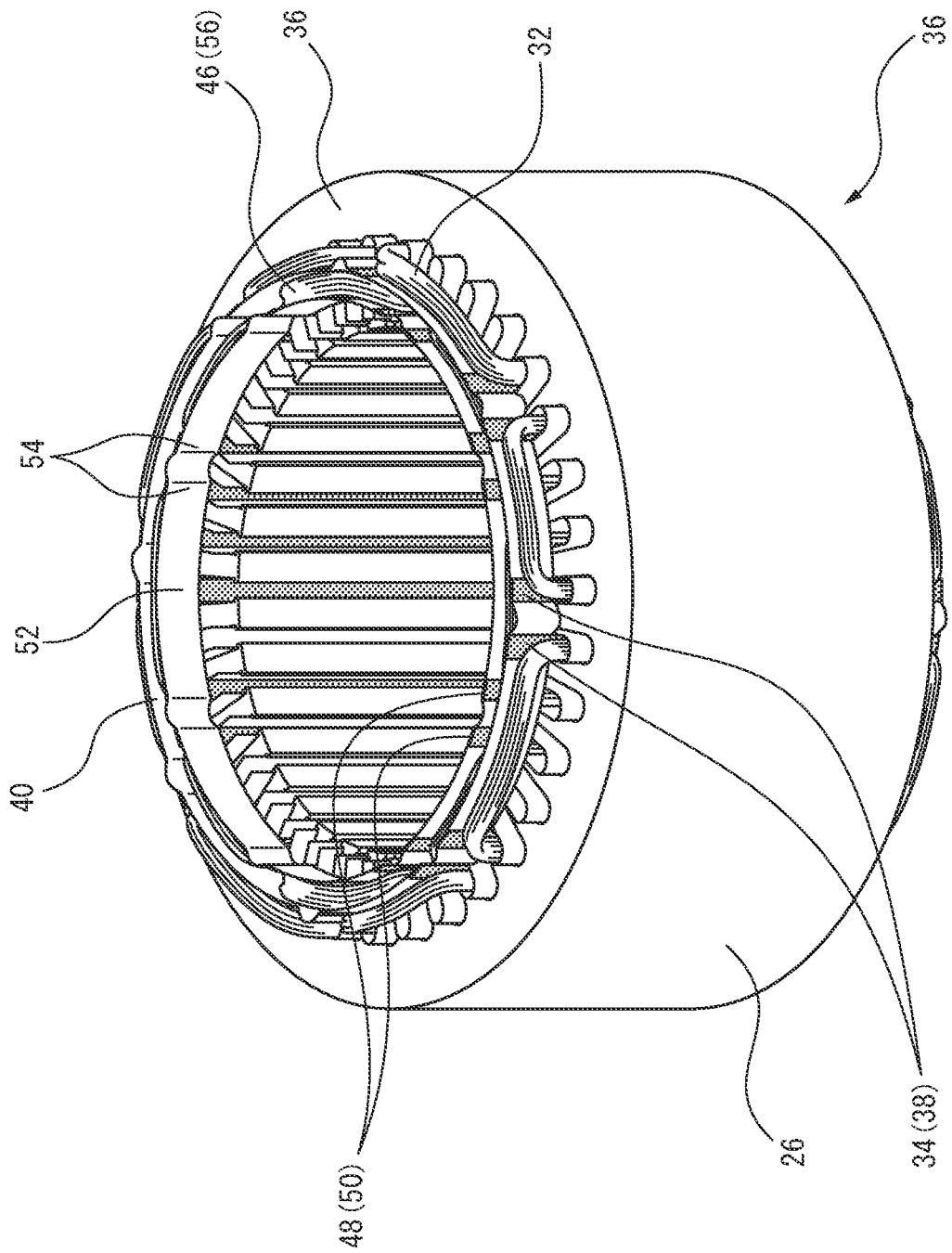
FIG. 10 is a view showing a state in which a second coil end insulating paper is adhered to a protruding portion of the second coil-to-coil insulating paper.

Next, as shown in FIG. 10, similarly to the process of FIG. 6, a plurality of second coil end insulating papers 52, each having an adhesive portion 54, are arranged so that one coil end insulating paper 52 is adhered to the plurality of protruding portions 50. In the illustrated embodiment, similarly to the first coin end insulating paper 40, the strip-shaped second coil end insulating paper 52 extends in the circumferential direction near the end surface 36 of the stator core 26, and the adhesive portions 54 provided at least at both ends of the insulating paper 52 are adhered to and overlapped with the protruding portion 50 of the second coil-to-coil insulating paper 48. In this regard, the second coil end insulating paper 52 may have the adhesive portion 54 on the entirety of one side thereof, and may be adhered to the protruding portion 50 and also to a coil end 56 of the coil 46.

Next, as shown in FIG. 10, the operation described with reference to FIG. 9 is repeated so that all of the protruding portions 50 are adhered to either of the plurality of second coil end insulating papers 52. In this regard, it is preferable that the coil end 56 of the (preferably all) V-phase coils 46 is also adhered to (the adhesive portion 54 of) the second coil end insulating paper 52. Further, as illustrated, the plurality of strip-shaped coil end insulating papers 52 can be adhered to each other at their longitudinal end portions to form a single ring shape as a whole, but this process may not be performed. The second coil end insulating paper 52 is configured and positioned so that the coil end 56 of the V-phase coil 46 and a coil end 60 of a W-phase coil 58 described later do not come into contact with each other (i.e., they are electrically insulated).

Figure 11:
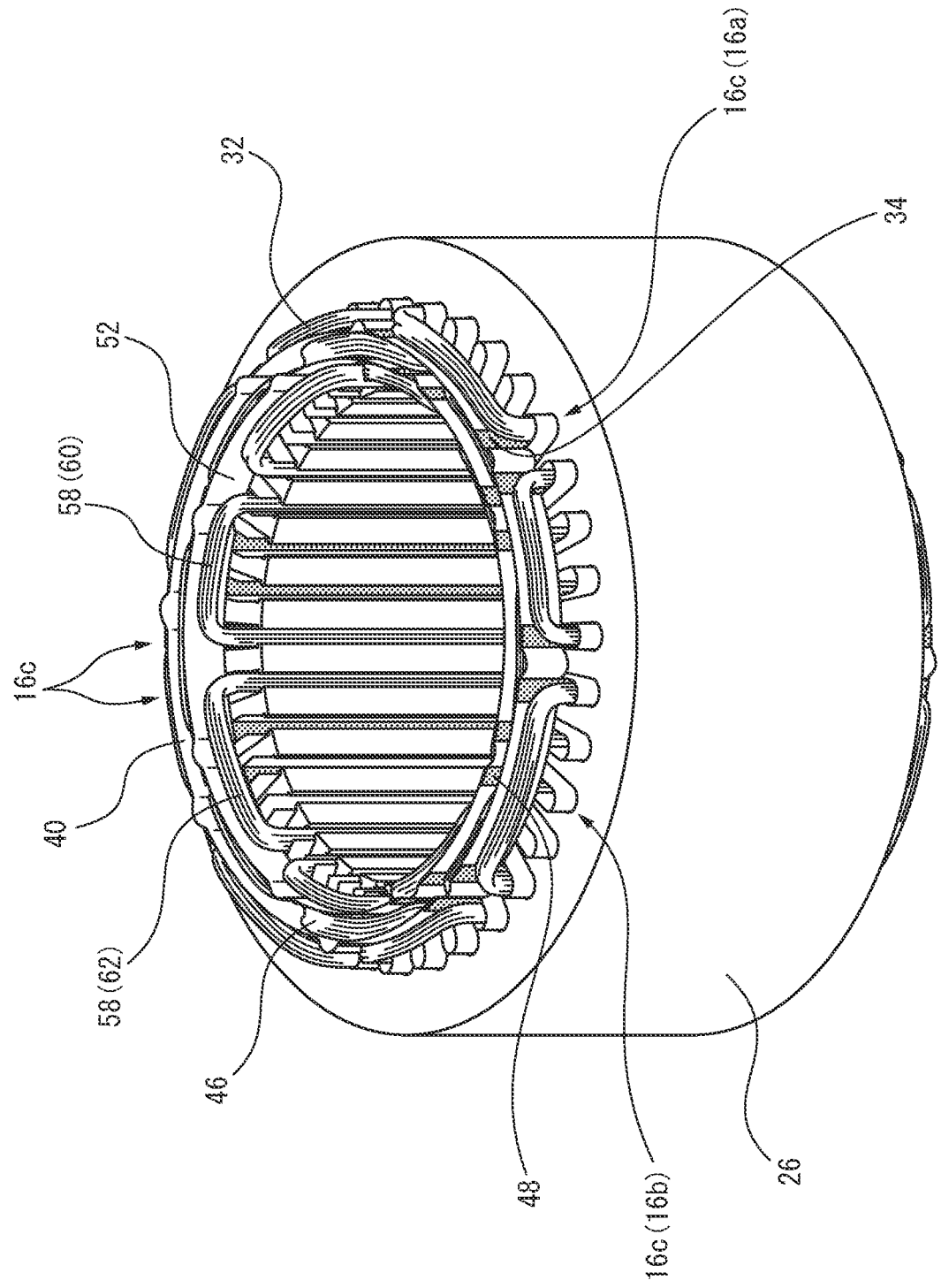
FIG. 11 is a view showing a state in which a coil of a third phase is inserted into the slot.

Next, as shown in FIG. 11, similarly to the processes of FIGS. 4 and 8, the winding wire (coil) 58 of the third phase (for example, W-phase) is inserted into some of the plurality of slots 16 (here, slots 16*c*). In this regard, the W-phase coil 58 may be inserted into the slot 16*a* into which the U-phase coil 32 is inserted or the slot 16*b* into which the V-phase coil 46 is inserted. In that case, in the slot 16*c* (16*a* or 16*b*), the first coil-to-coil insulating paper 34 or the second coil-to-coil insulating paper 48 is inserted between the U-phase coil 32 or the V-phase coil 46 and the W-phase coil 58. Specifically, the first coil-to-coil insulating paper 34 is configured and positioned so as to electrically insulate between the two coils (here, the U-phase coil 32 and the W-phase coil 58) having different phases, and similarly, the second coil-to-coil insulating paper 48 is configured and positioned so as to electrically insulate between the two coils having different phases.

Figure 12:
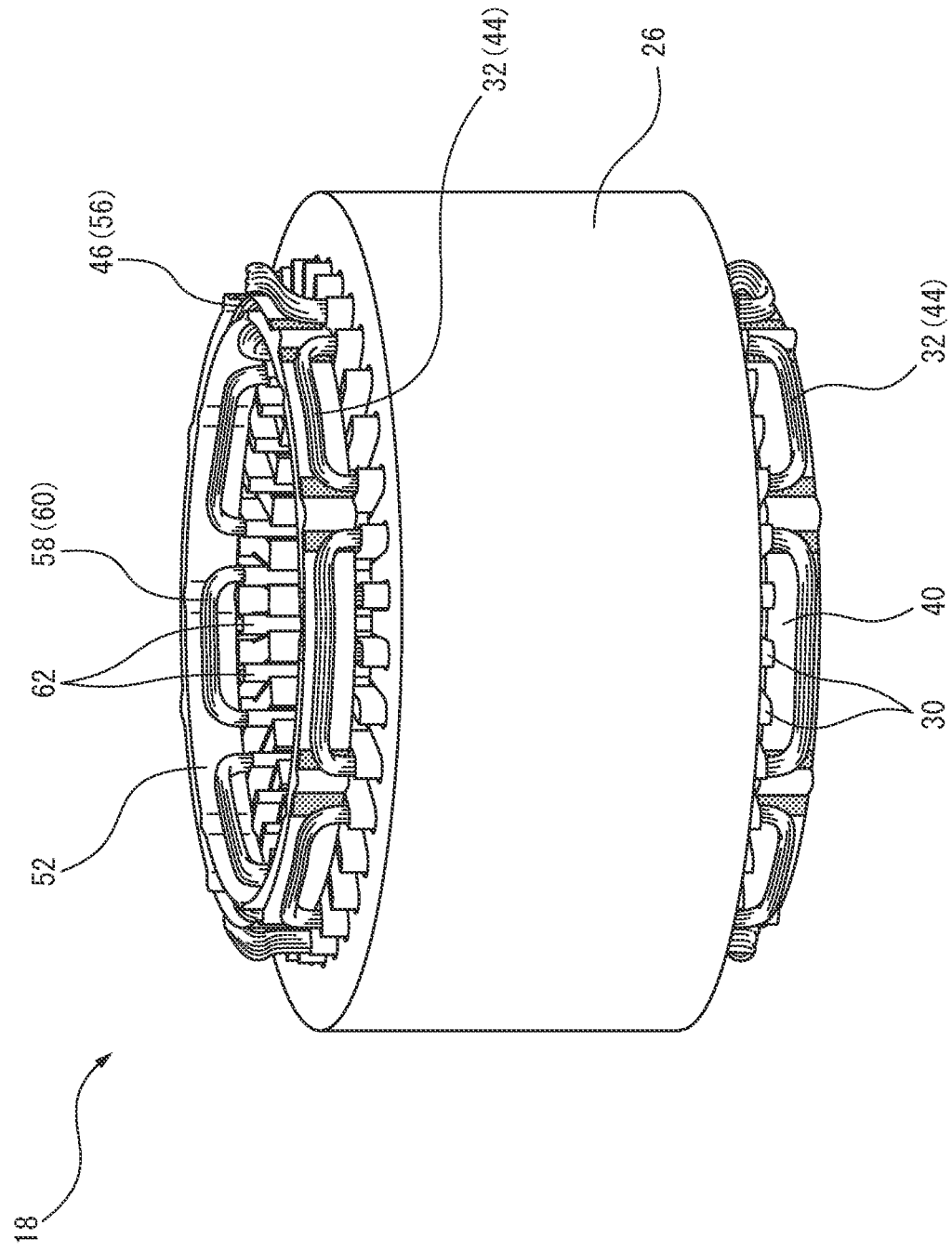
FIG. 12 is a view showing a state in which a wedge insulating paper is inserted into the slot.

Finally, as shown in FIG. 12, a wedge insulating paper 62 is inserted into the slots 16*a* to 16*c* into which at least either of the coils is inserted, or into all the slots 16. More specifically, the wedge insulating paper 62 has a length substantially equal to the axial length of the stator core 26 and a wedge-shaped cross-sectional shape. The wedge insulating paper 62 is positioned inside the stator core 26 in the radial direction with respect to the coils positioned in each slot, and has a function of holding the coil so that the coil does not shift in the slot or does not fall out of the slot.

Any of the steps shown in FIGS. 2 to 12 can be automated using well-known machinery and equipment, but some or all of them can also be performed manually. Further, in the first embodiment, the structure and arrangement of the coil end and/or the insulating paper at one end (upper end) in the axial direction of the stator 18 have been mainly described, whereas the lower end of the stator 18 may have the same structure and arrangement as the upper end, as shown in FIG. 12 as a part thereof.

Second Embodiment

Figure 13:
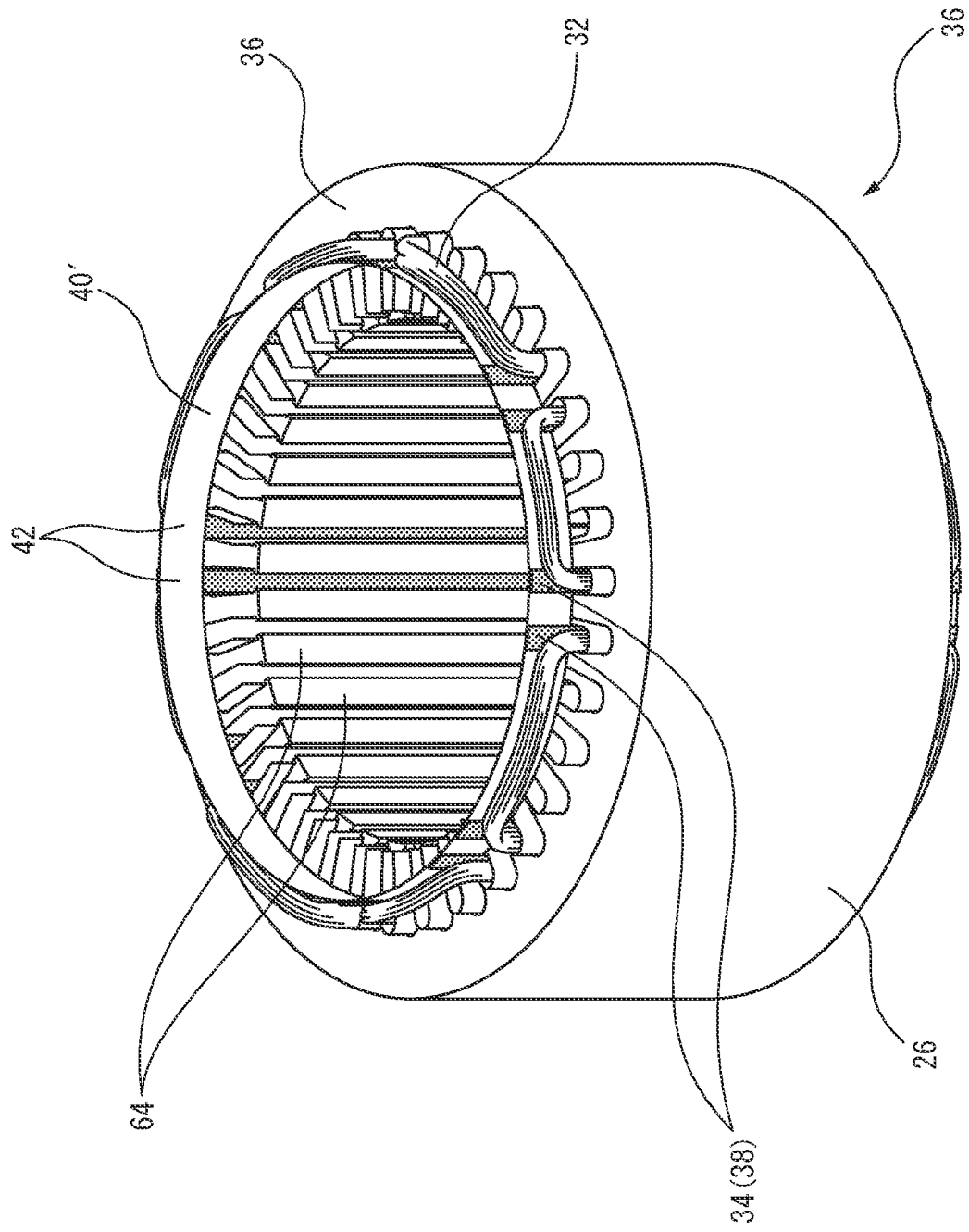
FIG. 13 is a view showing a state in which a first coil end insulating paper is adhered to a protruding portion of the first coil-to-coil insulating paper, in a stator according to a second embodiment.

FIG. 13 is similar to FIG. 7 and shows one step of the method for manufacturing the stator of the electric motor according to the second embodiment. In the first embodiment, the plurality of strip-shaped first coil-end insulating papers 40 are attached to the protruding portions 38 of the first coil-to-coil insulating paper 34 (FIG. 6), and then the first coil end insulating papers 40 are connected to each other to form one ring-shaped member (FIG. 7). On the other hand, in the second embodiment, a first coil end insulating paper 40' formed in advance in a roll shape or a ring shape is prepared, and the first coil end insulating paper 40' is attached to all the protruding portions 38 protruding from any of the axial ends (preferably the both ends) of the stator core. Since the other components of the second embodiment may be the same as those of the first embodiment, the same reference numerals as those of the first embodiment are added and detailed description thereof will be omitted.

Figure 14:
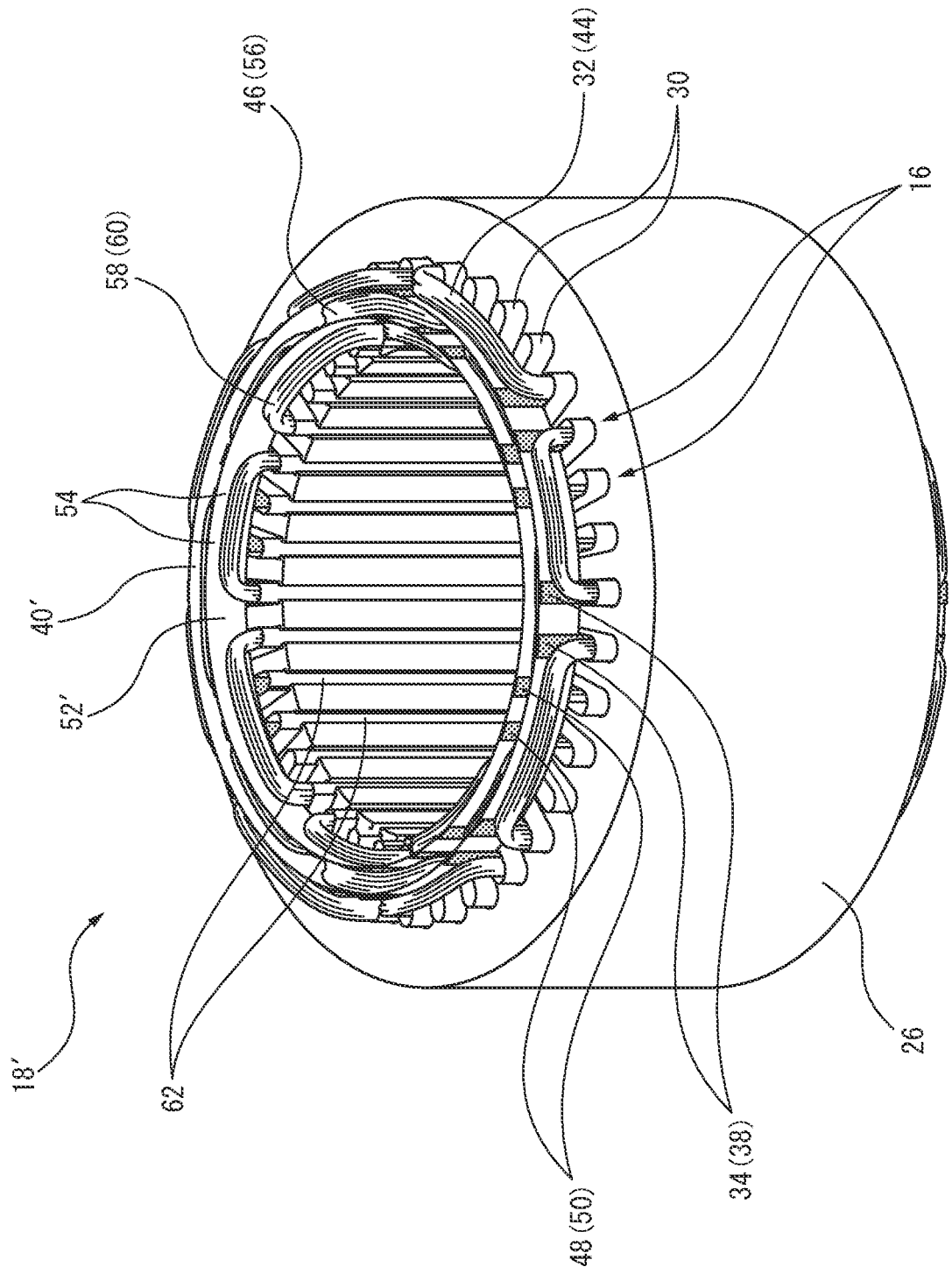
FIG. 14 is a view showing a state in which a wedge insulating paper is inserted into the slot.

FIG. 14 shows a state in which the wedge insulating paper 62 is inserted into the slot 16 in a stator 18' of the electric motor according to the second embodiment. In the first embodiment, the plurality of strip-shaped second coil-end insulating papers 52 are adhered to the protruding portions 50 of the second coil-to-coil insulating paper 48, and then the second coil end insulating papers 52 are connected to each other to form one ring-shaped member (FIG. 10). On the other hand, in the second embodiment, a second coil end insulating paper 52' formed in advance in a roll shape or a ring shape is prepared, and the second coil end insulating paper 52' is adhered to all the protruding portions 50 protruding from any of the axial ends (preferably both ends) of the stator core. Since the other components of the second embodiment may be the same as those of the first embodiment, the same reference numerals as those of the first embodiment are added and detailed description thereof will be omitted.

The manufacturing steps of the stator according to the second embodiment can also be automated using well-known machinery and equipment, but some or all of them can also be performed manually. Further, also in the second embodiment, the structure and arrangement of the coil end and/or the insulating paper may have the same structure and arrangement at the axial upper and lower ends of the stator 18.

Among the four types of insulating papers in the first and second embodiments, the shapes of the slot liner insulating paper and the wedge insulating paper may be the same as those used for the stator core of the conventional electric motor. Suitable materials for the slot liner insulating paper, the wedge insulating paper and coil-to-coil (phase-to-phase) insulating paper include a PPS film, a PET film, PEN film, a paper made of aramid fibers such as a Nomex (registered trademark) paper, a PPS, a multilayer mixed film containing an adhesive layer and a PET, and a multilayer film containing a paper made of aramid fibers and a PET film.

Suitable materials for the coil end insulating paper include a Nomex (registered trademark) paper coated with an acrylic adhesive to form an insulating adhesive tape, and a polyester film base material reinforced with epoxy resin coated with thermosetting rubber-based adhesive material to form an insulating adhesive tape. In particular, some of the latter have a very high elongation rate as a mechanical property of about 120%, which is particularly preferable for the following reasons.

In the actual manufacturing process of (the stator of) the electric motor, after all the coils are inserted into the slots as shown in FIG. 12 or FIG. 14, in order to adjust the shape of the coil end, a step of pressing both ends of the stator with a force of, for example, 1 to 5 tons to compress the coil end may be added. In the step of pressing, the coil end insulating paper adhered to the coil end expands or contracts, so if the elongation rate of the coil end insulating paper is relatively low, the coil end insulating paper may break and the insulation between the coil ends having different phases may be impaired. In order to avoid such a problem, the elongation rate as a mechanical property of the coil end insulating paper is preferably 50% or more, more preferably 80% or more, and further preferably 100% or more, considering the amount of deformation of the coil end due to general pressing.

Figure 15:
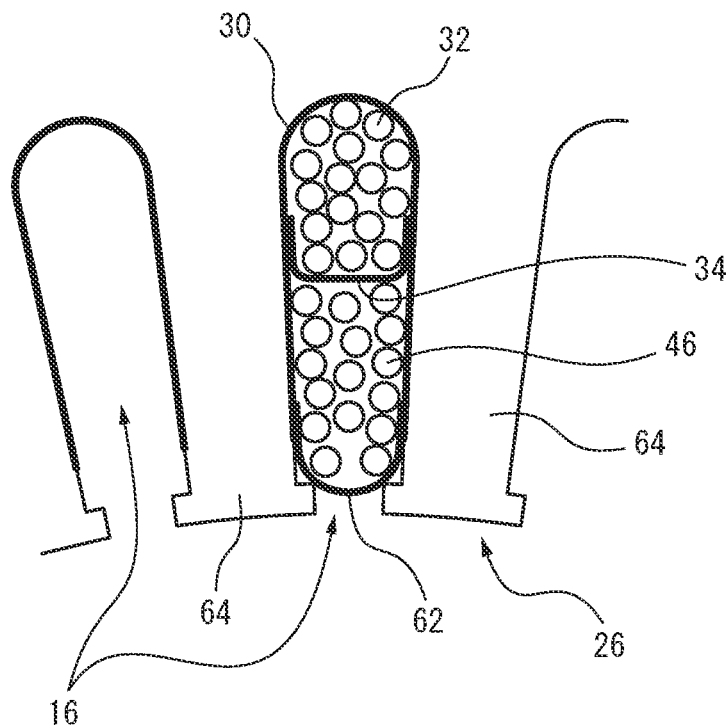
FIG. 15 is a view schematically showing a positional relationship between the coil and the insulating paper in the slot.

FIG. 15 shows the positional relationship between the coil and the insulating paper in the slot 16 of the stator core 26. The slot 16 is a space defined between a plurality of tooth portions 64 of the stator core 26. In the illustrated embodiment, the slot liner insulating paper 30, the U-phase coil 32, the first coil-to-coil insulating paper 34, the V-phase coil 46 and the wedge insulating paper 62 are positioned in the slot 16.

The slot liner insulating paper 30 is shaped along the internal shape of the slot 16 and has a function of insulating the stator core 26 from the coils 32 and 46. Further, the wedge insulating paper 62 closes the opening (slit) of the slot 16 so as to partially hold the V-phase coil 46 (mainly inside in the radial direction), so that the coil in the slot 16 is not displaced in the slot 16 and does not fall from the slot 16.

The first coil-to-coil insulating paper 34 has a function of partially surrounding the U-phase coil 32 (mainly inside in the radial direction) and insulating the U-phase coil 32 and the V-phase coil 46. In other words, when the two coils having different phases are inserted in the same slot, the first coil-to-coil insulating paper 34 is positioned between the coils and functions as the phase-to-phase insulating paper which insulates the coils from each other. This is also applicable to the second coil-to-coil insulating paper 48. When the three (three-phase) coils are inserted in one slot, the two coil-insulating papers are used to insulate the three coils from each other.

As described above, when the plurality of coils having different phases are inserted in one slot, the coil-to-coil insulating paper is positioned between the coils and functions as the phase-to-phase insulating paper which insulates the coils from each other. However, the coil-to-coil insulating paper may be inserted into the slot in which no coil is inserted, or may be inserted into the slot in which only one coil is positioned. In this regard, when the coil-to-coil insulating paper is to be inserted into the slot in which one coil is positioned, the coil-to-coil insulating paper is inserted after the coil is inserted. As such, the coil-to-coil insulating paper may not have the function as the phase-to-phase insulating paper, but even in that case, the coil-to-coil insulating paper functions as a member for easily and surely positioning and fixing the coil end insulating paper.

Figure 16:
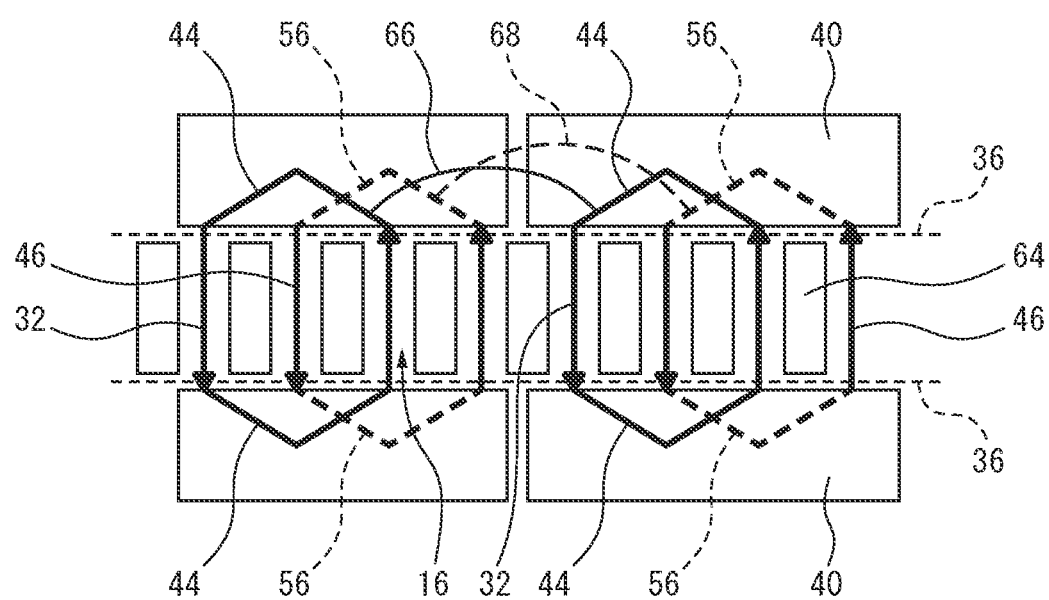
FIG. 16 is a view schematically showing a positional relationship between the coil and the coil end insulating paper.

FIG. 16 is a schematic view for explaining mainly the function of the coil end insulating paper, and here, the first coil end insulating paper 40 will be described as an example. Herein, it is assumed that the plurality of U-phase coils 32 and the plurality of V-phase coils 46 are inserted in the slot 16, the U-phase coils 32 are connected to each other by a connecting line 66, and the V-phase coils 46 are connected to each other by a connecting line 68.

As illustrated, in case that the coil end 44 of the U-phase coil 32 and the coil end 56 of the V-phase coil 46 overlap with each other when viewed in the radial direction of the stator. The first coil end insulating paper 40 is arranged between the coil ends so that the coil ends having different phases do not come into contact with each other or so that the connecting lines 66 and 68 do not come into contact (conduct) with each other. As such, the coil end insulating paper is a sheet-like member which insulates between the plurality of coil ends having different phases of flowing currents or the plurality of connecting lines, in the region outside the axial end surface 36 of the stator core.

The coil end insulating paper may be adhered to the coil end in order to prevent misalignment with the coil end, but this is not essential. In other words, the coil end insulating paper may be of any shape and material, as long as it is adhered to the plurality of coil-to-coil insulating papers and can physically separate the coil ends having different phases.

In the first and second embodiments, since the coil-to-coil insulating paper and the coil end insulating paper are both sheet-like members, they can be adhered to each other with a relatively high adhesive force. On the other hand, since the coil end is a bundle of windings, the adhesive strength with the coil end insulating paper is relatively low, the coil end insulating paper and the coil end may be separated from each other after the stator is manufactured or during the use of the electric motor. However, as described above, the coil end insulating paper only needs to be able to physically separate the coil ends having different phases, and thus there is no problem in the performance of the electric motor. Further, since the coil end insulating paper is a flexible sheet-like member such as paper or film, it easily follows the shape of the coil end, and thus it is not necessary to lengthen the coil end (coil length).

In the above embodiments, the coil-to-coil insulating paper can be automatically inserted into the slot, and can be inserted by the same device and method as the wedge insulating paper. Further, the coil end insulating paper (for example, adhesive tape) having the adhesive portion is suitable for automation in its arrangement because it is easy to be positioned. In particular, as in the first embodiment, when arranging the coil end insulating paper as the plurality of strip-shaped members at each end of the stator core, automation is facilitated by forming a mount adhered to the adhesive portion in a predetermined shape in advance. Further, if the coil end insulating paper is also adhered to the coil end when the coil end insulating paper is adhered to the protruding portion of the coil-to-coil insulating paper, positioning and fixing in the radial direction becomes easy. As such, in the present disclosure, the simple strip-shaped coil-to-coil insulating paper and the strip-shaped or ring-shaped coil end insulating paper can be used to insulate the coils with an inexpensive and simple structure. Further, even if the number of poles and/or the winding arrangement is different, it is not necessary to prepare coil-to-coil insulating paper and the coil-end insulating paper having different shapes.

REFERENCE SIGNS LIST 10 three-phase AC motor
12 rotor
14 rotation axis
16, 16a, 16b, 16c slot
18, 18' stator
20 magnet
22 rotor core
24 shaft
26 stator core
30 slot liner insulating paper
32, 46, 58 coil
34, 48 coil-to-coil insulating paper
36 end surface
38, 50 protruding portion
40, 40', 52, 52' coil end insulating paper
42, 54 adhesive portion
44, 56, 60 coil end
62 wedge insulating paper
64 tooth portion
66, 68 connecting line

The invention claimed is:

1. A stator of an electric motor, comprising:
a stator core having a plurality of slots;
a plurality of coils positioned in the slots, each coil having a coil end positioned outside relative to an axial end of the stator core;
at least one coil end insulating paper positioned between the coil ends so as to insulate the coil ends from each other;
a plurality of coil-to-coil insulating papers positioned in the slots, each coil-to-coil insulating paper having a protruding portion which protrudes from at least one of two axial ends of the stator core; and
a wedge insulating paper positioned in the slot where the coil is positioned, the wedge insulating paper positioned inside in a radial direction of the stator core relative to the coil,
wherein each of the coil end insulating papers has an adhesive portion, and a plurality of the protruding portions are adhered to one coil end insulating paper.

2. The stator of the electric motor according to claim 1, wherein the coil-to-coil insulating paper also functions as a phase-to-phase insulating paper positioned in one of the slots, which insulates the coils from each other into which currents of different phases flow.

3. The stator of the electric motor according to claim 1, wherein the coil-to-coil insulating paper protrudes from both ends of the stator core.

4. The stator of the electric motor according to claim 1, wherein the adhesive portion of the coil end insulating paper is also adhered to the coil end.

5. The stator of the electric motor according to claim 1, wherein the coil end insulating paper has an elongation rate of 50% or more as a mechanical property.

6. An electric motor having the stator according to claim 1.

7. A manufacturing method of a stator of an electric motor, comprising:
inserting a plurality of coils into a plurality of slots of a stator core so that each coil has a coil end positioned outside relative to an axial end of the stator core;
inserting a plurality of coil-to-coil insulating papers into the slots so that each coil-to-coil insulating paper has a protruding portion which protrudes from at least one of two axial ends of the stator core; and
positioning at least one coil end insulating paper having an adhesive portion at at least one of the both axial ends of the stator core so that each coil end insulating paper is positioned between the coil ends and a plurality of the protruding portions are adhered to each coil end insulating paper.

8. The manufacturing method according to claim 7, comprising:
inserting the plurality of coil-to-coil insulating papers into the slots so that each coil-to-coil insulating paper has protruding portions which protrude from the two axial ends of the stator core; and
positioning at least one coil end insulating paper having the adhesive portion at each of the both axial ends of the stator core so that each coil end insulating paper is positioned between the coil ends and a plurality of the protruding portions are adhered to each coil end insulating paper.

9. The manufacturing method according to claim 7, comprising:
providing a plurality of strip-shaped coil end insulating papers; and
positioning the plurality of coil end insulating papers so that all of the plurality of protruding portions protruding from the same axial end of the stator core are adhered to either of the coil end insulating papers.

10. The manufacturing method according to claim 7, comprising:
providing a plurality of ring-shaped coil end insulating papers having a diameter larger than an inner diameter of the stator core; and
adhering the plurality of coil end insulating papers to all of the protruding portions protruding from the same axial end of the stator core.

11. The manufacturing method according to claim 7, wherein the positioning the coil end insulating papers includes adhering the coil end insulating papers to the coil ends.

* * * * *